Feb. 17, 1953          C. F. FERNALD          2,628,783
CONTROL UNIT FOR THERMOSTATIC VALVES
Filed Dec. 24, 1949          2 SHEETS—SHEET 1
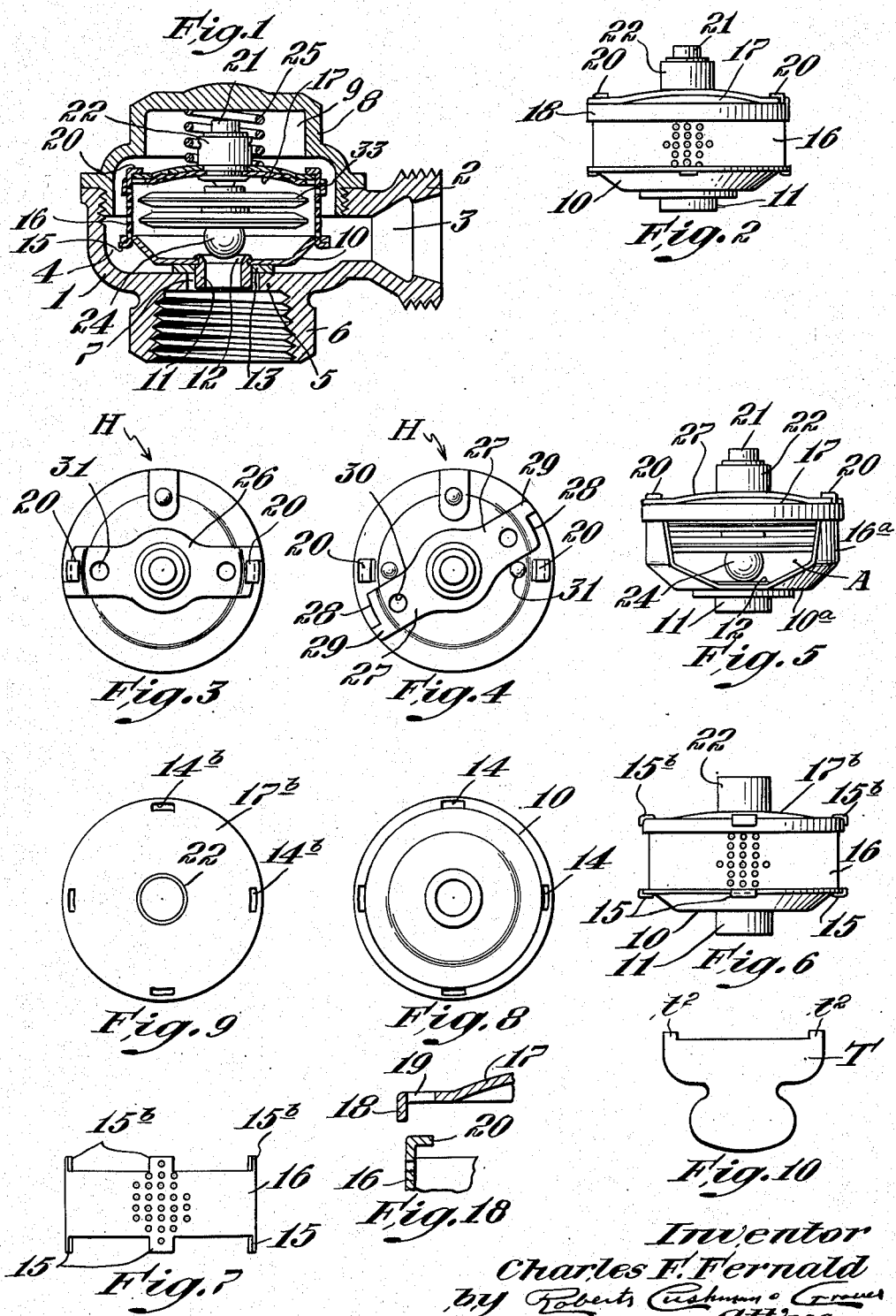
Inventor
Charles F. Fernald
by Roberts Cushman Grover
att'ys.

Feb. 17, 1953 — C. F. FERNALD — 2,628,783
CONTROL UNIT FOR THERMOSTATIC VALVES
Filed Dec. 24, 1949 — 2 SHEETS—SHEET 2

*Inventor*
*Charles F. Fernald*
by Roberts, Cushman & Grove
att'ys

Patented Feb. 17, 1953

2,628,783

UNITED STATES PATENT OFFICE 2,628,783

CONTROL UNIT FOR THERMOSTATIC VALVES

Charles F. Fernald, Jamaica Plain, Mass., assignor to Barnes & Jones, Incorporated, Jamaica Plain, Mass., a corporation of Massachusetts Application December 24, 1949, Serial No. 134,971

9 Claims. (Cl. 236—58)

This invention pertains to thermostatic traps of the kind commonly employed as the outlet valve for a steam radiator, and relates more particularly to an improved control unit for such valves.

The patent to Jones No. 1,911,230, May 30, 1933, describes a control unit for use in valves of the above type wherein the valve seat, the valve feather or head, and the thermally responsive motor or actuator are all arranged within a cage structure or housing, designed to be handled or installed as a unit and which, in use, is located within the outer casing of the valve. As illustrated in the patent and as usually constructed, the cage or housing comprises a cylindrical side wall and top and bottom members which are permanently united. Usually the cylindrical side wall of the cage has one or more large apertures to facilitate the free entrance of the steam or hot water to act upon the thermally responsive motor. As these apertures are of substantial size, rust or sediment entering through these apertures may collect on or about the valve seat so as to interfere with the proper operation of the valve. Since the parts comprising the cage are not intended to be separated, the valve feather and seat are not readily accessible so that it is difficult to clean them.

One object of the present invention is to provide a control unit having provision for excluding large particles of sediment or rust from its interior, while at the same time providing for free access of steam or water. A further object is to provide a control unit having provision for so uniting its parts that its interior may be made accessible for cleaning or repair of the valve seat or feather. A further object is to provide a control unit wherein the cover which carries the thermally responsive motor and valve head is normally securely attached to the peripheral wall of the cage but is readily movable to give access to the interior without recourse to the use of the tools. A further object is to provide a control unit so devised that its interior may be made readily accessible but wherein the parts are so connected that they can not become separated and misplaced or their initial adjusted relation to each other changed during the time when the interior of the cage is accessible. A further object is to provide a control unit wherein the cage structure is of simple and inexpensive form but strong and durable and provided with simple latch means for detachably connecting its cover to the other parts of the cage. Other and further objects and advantages of the invention will be pointed out in the following more detailed description and by reference to the accompanying drawings wherein Fig. 1 is a diametrical section through a radiator outlet valve embodying a control unit in accordance with the present invention;

Fig. 2 is a side elevation of a preferred form of the control unit removed from the valve casing;

Fig. 3 is a plan view of the cage unit of Fig. 2 showing the cover locked in place;

Fig. 4 is a view similar to Fig. 3 but showing the cover locking latch disengaged to permit separation of the cover from the body of the cage;

Fig. 5 is a side elevation, similar to Fig. 2, but illustrating a modified form of cage;

Fig. 6 is a side elevation of a further modified construction;

Fig. 7 is a side elevation of the peripheral wall of the cage of Fig. 6, showing the parts before assembly with the bottom and cover;

Fig. 8 is a plan view of the bottom of the control unit of Fig. 6;

Fig. 9 is a view of the underside of the cover of the control unit of Fig. 6;

Fig. 10 is an elevation of a tool useful in actuating the cover-locking latch;

Fig. 18 is a fragmentary view, to large scale, showing the cover in readiness to be closed and engaged with the locking element of the edge wall.

Figure 11:
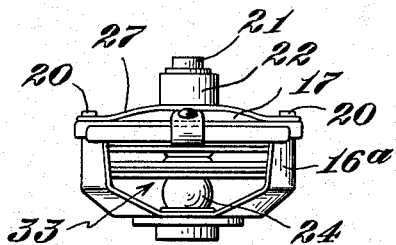
Fig. 11 is a rear elevation of the cage unit like that of Fig. 5 showing the cover attached to the side wall by a hinge.

Referring to the drawings and particularly to Figs. 1 and 2, the improved control unit is illustrated as embodied in an outlet valve such as commonly employed for automatically controlling the flow of steam through a radiator. This valve, as here shown, comprises a usual form of casing or body 1 provided at one side with a projecting, externally screw-threaded nipple 2 for attachment to the radiator, such nipple having the passage 3 leading to the chamber 4 in the valve body or casing. This chamber is provided with a bottom wall 5 from which projects the downwardly extending internally screw-threaded socket member 6 adapted to receive the return pipe from the radiator, the bottom wall 5 having an aperture or orifice 7 leading from the chamber 4 to the interior of socket member 6. The valve casing is provided with the cover 8, and this cover is provided with a cavity 9 which defines the upper part of the chamber 4. The improved control unit of the present invention is normally housed in the chamber 4. It may be freely placed in this chamber and as freely removed after the cover 9 has been separated from the body of the casing.

As illustrated in Figs. 1 and 2, the control unit comprises a frame or cage having a bottom member 10, usually of sheet metal, provided with a downwardly projecting tubular boss 11 adapted to enter freely into the aperture or orifice 7, the passage through the boss 11 providing communication between the interior of the cage and the interior of the socket member 6. The outer surface of the boss 11 is preferably smooth, that is to say, not screw threaded, and in any event its external diameter is such that it may be freely entered into the discharge passage, that is to say, into the aperture 7 of a usual valve casing without requiring the application of force or the use of tools. The upper end of the member 11 is properly shaped at 12 to constitute an annular valve seat. Suitable packing means, for example a gasket 13, of soft lead or the like is usually arranged between the bottom 10 of the cage and the floor 5 of the chamber 4.

The cage also comprises a peripheral wall 16, preferably cylindrical, which, in the embodiment shown in Fig. 1, is provided with downwardly directed integral tabs 15 (Fig. 7). This peripheral wall 16 is formed of sheet metal, perforated with a multitude of small perforations, for example of the order of 1 mm. in diameter, which collectively permit steam or hot water to enter the cage but which are so small individually as substantially to exclude solid particles of rust or sediment.

The cage also comprises a top or cover member 17 (Figs. 2 and 18) having a downwardly directed peripheral flange 18 designed to fit about the upper part of the peripheral wall 16. The top of the cover 17 is provided with diametrically arranged slots 19, and, in the embodiment of the invention illustrated in Figs. 1 to 4 inclusive and Fig. 18, the peripheral wall 16 has integral upwardly directed tabs 20 which extend up through the slots 19 of the cover 17 when the parts are assembled. These tabs 20 extend up beyond the upper surface of the cover 17 and their upper ends are bent inwardly to form hook-like locking elements.

Figure 14:
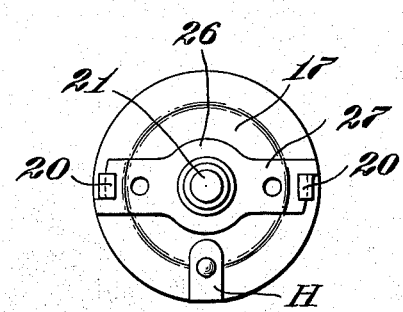
Fig. 14 is a plan view of the control unit of Fig. 11 with the cover closed.
Figure 12:
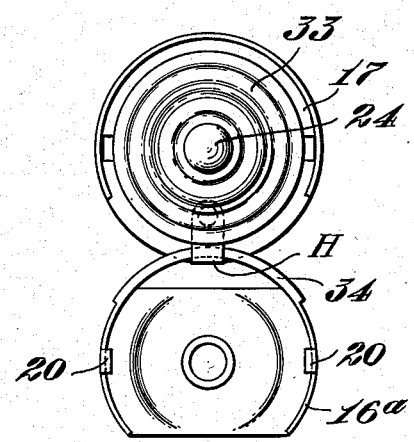
Fig. 12 is a plan view of the cage unit of Fig. 11 showing the cover swung to fully open position.
Figure 15:
Fig. 15 is a side elevation, to large scale, of the sleeve which connects the cover and the stem of the motor device.
Figure 17:
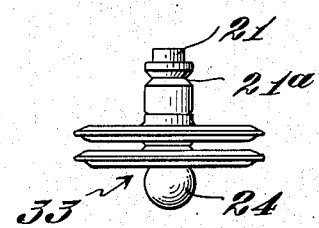
Fig. 17 is a side elevation, to smaller scale, of the motor device and stem, separate from the other parts.
Figure 16:
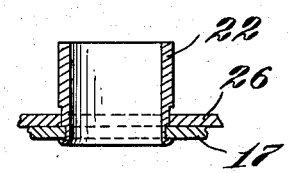
Fig. 16 is a fragmentary, diametrical section through the cover and the stem-positioning sleeve.

The cover 17 is provided at its center with a fixed sleeve 22 (Figs. 14 and 15). The sleeve has a shoulder 22ª spaced a short distance above the upper surface of the cover 17, and between this shoulder 22ª and the upper surface of the cover (Fig. 16) there is arranged the hub portion 26 of a rotatable latch member designed to turn freely on the sleeve and comprising oppositely directed arms 27 each having an end portion 28 which may, if desired, be beveled, designed to slide beneath one of the hook-like locking elements 20. The end of each arm is also provided with a suitable stop element 29 engageable with the side of the locking element to limit movement of the latch member. Each arm 27 is also provided with an aperture 30, and the cover 17 is provided with upwardly directed rounded bosses 31 adapted to enter the apertures 30 and thus to hold the latch member in locking position until it is properly released. A suitable tool T, illustrated in Fig. 10, in the nature of a spanner wrench having the pins $t^2$ which enter the openings 30, may be used for turning the latch member for locking or disengaging it from the locking elements 20.

The thermally responsive motor device 33 has a supporting stem 21 whose upper portion fits within the bore of the sleeve 22 and which has a circumferential groove 21ª. In assembling the parts, the cover, latch member and sleeve are first assembled and the sleeve is permanently united to the cover, for example, by staking over the lower end of the sleeve. The stem of the motor device is then slid up into the sleeve and the cover is assembled with the cage. While the parts are so assembled they are subjected to a calibrating temperature, and, while this temperature is maintained, the sleeve is indented into the groove 21ª so as to hold the stem and sleeve in assembled relation.

The motor device 33 supports the valve head 24, here shown as of generally spherical contour and which is designed to seat on the seat 12 so as to close off communication between the interior of the cage 4 and the delivery passage in the part 6. A spring 25 bears at its lower end against the top of the cover 17 and at its upper end against the interior of the cover 8. This spring thus forces the bottom 10 of the cage unit down against the gasket 13 so as normally to prevent leakage beneath the cage unit.

The bottom member 10 of the cake is fixedly secured to the peripheral wall 16 by passing the tabs 15 down through slots in the bottom member 10 and then bending them so as to provide a permanent connection between the bottom and the peripheral wall. Obviously other types of permanent connection, for example, soldering or welding, may be employed or in fact the peripheral wall 16 may be made integral with the bottom 10 if desired.

The cover 17 is assembled with the peripheral wall of the cage by passing the hook-like locking elements 20 up through the slots 19 in the cover and then the latch member is rotated by the use of tool T so as to cause its end portions 28 to enter beneath the locking elements 20, the movement of the latch member being continued until the stops 29 engage the sides of the locking elements 20. As the parts reach this position, the apertures 30 are registered with the bosses 31, thus retaining the locking member 26 in position. The entire cage unit is now placed within the valve casing, the spring 25 is put in place, and the cover 8 is screwed into the casing.

If, after a period of use it becomes desirable to clean the device, the cover 8 may be removed and the cage unit removed from the valve chamber, and by turning the latch member the cover of the cage unit may be moved so as to expose the interior.

In the construction illustrated in Fig. 5, the bottom 10ª of the cage has integral upward extensions 16ª which form the side wall 16 of the cage. In this arrangement, shown in Fig. 5, instead of employing perforated material for the side wall 16ª, the latter is made of ordinary sheet metal but the side wall is provided with one or more large apertures A. This arrangement is not so effective in preventing the accumulation of sediment or rust within the cage, but it leaves the interior of the cage exposed for inspection without requiring that the cover 17 be removed and eliminates the possibility of retardation of free fluid flow to the interior. However, as in the arrangement shown in Figs. 1 to 4, the cover 17 is movable by releasing the latch from the locking elements 20, thus permitting the valve head and actuating motor to be moved to give access to the cage for cleaning.

Figure 13:
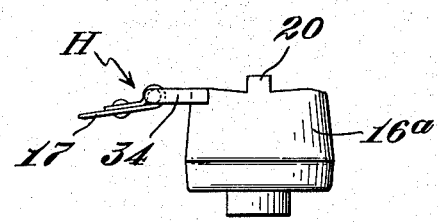
Fig. 13 is a fragmentary side elevation of the control unit of Fig. 11 showing the cover (broken away) swung to fully open position.

Although the cover may be wholly separable from the cage, it is preferable to connect them so that (while relatively movable to give access to the interior of the cage) they can not be wholly separated. This is particularly desirable when, as above described, each thermal motor is connected to its motor while the assembled cage unit is exposed to a predetermined calibrated temperature. If such individually calibrated control units were to have the covers removed and interchanged, the initial calibration would be lost. For this reason it is preferred to connect the cover to its individual cage so that they can not be wholly separated. To this end the cover is preferably connected to the cage by a hinge H (Figs. 3, 4, 11, 12 and 13). This hinge may be of any desired type. In Figs. 13 and 14, which specifically illustrate that form of the device shown in Fig. 5, a length of stiff wire 34, curved to an arc, is fixed at its opposite ends to the upper edges of the spaced wall sections 16ª, this wire constituting the pintle of the hinge H.

In the arrangements shown in Figs. 6 to 9 the bottom 10 of the cage is like that above described and the cylindrical wall 16 is of perforated sheet metal. However, in this instance the peripheral wall 16, in addition to the tabs 15 which pass down through slots 14 in the bottom 10, has the upstanding integral tabs 15ᵇ shown in Fig. 7, and these tabs are passed up through slots 14ᵇ in the cover member 17ᵇ (Fig. 9) and then turned over, as shown in Fig. 6, so as permanently to unite the cover to the peripheral wall 16. As above suggested, instead of using bent-over tabs for uniting the parts, the bottom 10 and cover 17ᵇ may be secured to the peripheral wall 16 by solder or welding. With this arrangement it is not intended that the cover 17ᵇ shall be removed, but by reason of the small perforations in the wall 16 the entrance of sediment and rust particles is made difficult.

While desirable embodiments of the invention have been illustrated by way of example, it is to be understood that the invention is broadly inclusive of any and all modifications falling within the scope of the appended claims.

I claim:

1. An interchangeable control unit for use in valves of the class described, said unit comprising a cage including means defining a bottom and a cylindrical peripheral wall, the bottom carrying the valve seat, and a cover carrying a thermostatic motor, and a valve feather supported by the motor, the peripheral wall having diametrically opposed lock elements which project up through apertures in the cover, a latch member pivotally connected to the cover at the center of the latter, the latch member having oppositely extending resilient arms for engagement with the two lock elements, respectively, each arm having an aperture, and the cover having upward projections which seat in the respective apertures when the latch member is in operative position thereby to prevent accidental movement of the latch member.

2. An interchangeable control unit for use in valves of the class described, said unit comprising a cage including means defining a bottom and a cylindrical peripheral wall, the bottom carrying the valve seat, and a cover carrying a thermostatic motor, and a valve feather supported by the motor, the peripheral wall having a plurality of integral hooked tabs projecting upwardly through the openings in the cover, said tabs being symmetrically arranged relatively to the axis of the cover, and a rotatable locking device mounted on the cover to turn about the axis of the latter, said locking device being engageable simultaneously with the opposite hooked tabs, thereby to secure the cover to the peripheral wall of the cage.

3. An interchangeable control unit for use in valves of the class described, said unit comprising a cage within which is arranged the valve seat, the thermally responsive motor, and the valve feather, the cage comprising a bottom, a peripheral wall of perforated metal, and a cover, the valve seat being supported by the bottom and the valve feather and the motor being supported by the cover, the peripheral wall having upwardly and downwardly directed tabs which pass through openings in the cover and bottom respectively, the downwardly directed tabs being permanently connected to the bottom wall, and a movable latch device carried by the cover, the upwardly directed tabs being shaped for interlocking engagement with the latch device thereby removably to secure the cover to the peripheral wall.

4. An interchangeable control unit according to claim 3 having means so permanently uniting the cover to another part of the cage that the cover may be moved to expose the valve seat.

5. An interchangeable control unit according to claim 3 having hinge means, so uniting the cover of the cage to the peripheral wall of the cage that the cover may be moved to expose the valve seat.

6. An interchangeable control unit for use in a radiator outlet valve of the kind wherein a rigid fluid-tight casing having a removable cover defines a chamber for the reception of the control unit, the casing having a bottom wall provided with an outlet orifice and a side wall provided with an inlet orifice opening into said chamber, said unit comprising a cage of a size to be received within said chamber of the casing and including means defining a bottom, a cover and a side wall, the side wall having an aperture providing for flow of fluid between the interior of the cage and the chamber of the casing, the bottom of the cage carrying the valve seat and the cover of the cage carrying a thermostatic motor and valve feather supported by the motor, the side wall of the cage having a lock element which projects upwardly through an aperture in the cover and a movable latch member carried by the cover of the cage and which is engageable with said lock element thereby normally holding the cover in operative position.

7. An interchangeable control unit for use in a radiator outlet valve of the kind wherein a rigid fluid-tight casing having a removable cover defines a chamber for the reception of the control unit, the casing having a bottom wall provided with an outlet orifice and a side wall provided with an inlet orifice opening into said chamber, said unit comprising a cage of a size to be received within said chamber of the casing and including means defining a bottom, a cover and a side wall, the side wall having an aperture providing for flow of fluid between the interior of the cage and the chamber of the casing, the bottom of the cage carrying the valve seat and the cover of the cage carrying a thermostatic motor and a valve feather supported by the motor, the side wall of the cage having a lock element which projects upwardly through an aperture in the cover of the cage, a rotary latch member mounted on the cover of the cage and which is engageable with the lock element to hold the cover in operative position, and retaining means operative to prevent accidental movement of the latch member.

8. An interchangeable control unit for use in a valve of the kind wherein a rigid fluid-tight casing having integral nipple portions for connecting it to supply and outlet conduits, respectively, defines a chamber for the reception of the control unit, said chamber always communicating with the supply nipple, the control unit comprising a cage including means defining a bottom and a side wall, the side wall having apertures for the passage of fluid, the bottom carrying the valve seat, a cover carrying a thermostatic motor and a valve feather supported by the motor, the side wall of the cage having a lock element which projects upwardly, a movable latch member carried by the cover of the cage and which is engageable with said lock element thereby normally holding the cover of the cage in operative, closed position, and hinge means so uniting the cover of the cage to the side wall of the cage that the cover may be moved to expose the valve seat.

9. An interchangeable control unit for use in radiator outlet valves of the class described, said unit comprising a cage including means defining a bottom and a peripheral wall, the bottom carrying the valve seat, and a cover carrying a thermostatic motor, a valve feather supported by the motor, the peripheral wall of the cage having diametrically opposed lock elements which project up through apertures in the cover of the cage, a latch member pivotally connected to the cover of the cage at the center of the cover, the latch member having oppositely extending, resilient arms for engagement with the two lock elements respectively, each arm having an aperture and the cover of the cage having upwardly directed projections which seat in the respective apertures when the latch member is in operative position thereby to prevent accidental movement of the latch member, and hinge means so connecting the cover to the peripheral wall of the cage that the cover may be moved to expose the valve seat.

CHARLES F. FERNALD.

REFERENCES CITED

The following references are of record in the file of this patent:

UNITED STATES PATENTS

| Number | Name | Date |
|---|---|---|
| 1,087,119 | Hoffman | Feb. 17, 1914 |
| 1,352,808 | Hoffman | Sept. 14, 1920 |
| 1,911,230 | Jones | May 30, 1933 |

FOREIGN PATENTS

| Number | Country | Date |
|---|---|---|
| 129 | Great Britain | 1913 |
| 482,058 | Great Britain | Mar. 23, 1938 |